United States Patent
Boschet et al.

(10) Patent No.: US 8,552,347 B2
(45) Date of Patent: Oct. 8, 2013

(54) METHOD AND A DEVICE FOR BONDING A METAL FAIRING TO THE LEADING EDGE OF AN AIRFOIL

(75) Inventors: Patrick Boschet, Montigny le Bretonneux (FR); Thomas Navarre, Paris (FR); Bruno Lorcet, Les Ulis (FR)

(73) Assignee: Eurocopter, Marignane Cedex (FR)

( * ) Notice: Subject to any disclaimer, the term of this patent is extended or adjusted under 35 U.S.C. 154(b) by 1484 days.

(21) Appl. No.: 12/173,034

(22) Filed: Jul. 15, 2008

(65) Prior Publication Data

US 2009/0057297 A1 Mar. 5, 2009

(30) Foreign Application Priority Data

Jul. 17, 2007 (FR) .................................. 07 05154

(51) Int. Cl.
- *B23K 13/01* (2006.01)
- *B29C 65/00* (2006.01)
- *G01K 3/00* (2006.01)

(52) U.S. Cl.
USPC ........... 219/603; 219/609; 219/633; 219/635; 219/649; 219/650; 156/272.4; 156/380.2; 156/274.2; 156/379.6; 156/297; 374/137

(58) Field of Classification Search
USPC ................. 219/609, 633, 635, 649, 650, 603; 156/272.4, 380.2, 274.2, 379.6, 379.7, 214, 156/212, 242, 245, 297, 298, 379.8, 241; 374/137

See application file for complete search history.

(56) References Cited

U.S. PATENT DOCUMENTS

| | | | |
|---|---|---|---|
| 3,837,984 A * | 9/1974 | Wagner et al. ................. 428/349 |
| 4,846,916 A * | 7/1989 | Kobayashi et al. ......... 156/274.6 |
| 5,444,220 A | 8/1995 | Hansen et al. |
| 5,481,091 A * | 1/1996 | Grimm et al. ................. 219/633 |
| 5,603,795 A * | 2/1997 | Paulauskas et al. ......... 156/272.4 |
| 6,040,563 A | 3/2000 | Matsen et al. |
| 2001/0052520 A1 * | 12/2001 | Lappi et al. ................... 219/633 |
| 2002/0108704 A1 * | 8/2002 | Umezawa et al. ............. 156/245 |
| 2005/0155702 A1 * | 7/2005 | Ganz ........................... 156/272.4 |
| 2007/0023422 A1 * | 2/2007 | Obata et al. ................... 219/633 |

FOREIGN PATENT DOCUMENTS

| | | |
|---|---|---|
| EP | 0 529 917 | 3/1993 |
| WO | WO 01/30116 | 4/2001 |

* cited by examiner

*Primary Examiner* — Henry Yuen
*Assistant Examiner* — Ket D Dang
(74) *Attorney, Agent, or Firm* — Brooks Kushman P.C.

(57) ABSTRACT

A method and a device (1) for bonding a metal fairing (6) to protect a leading edge of an aircraft airfoil (7), the metal fairing (6) is designed to be bonded against the airfoil (7) with the help of an adhesive (9). The bonding device (1) is remarkable in that it includes a rigid yoke (2) having inserted therein induction heater elements (30) for heating the metal fairing (6).

17 Claims, 1 Drawing Sheet

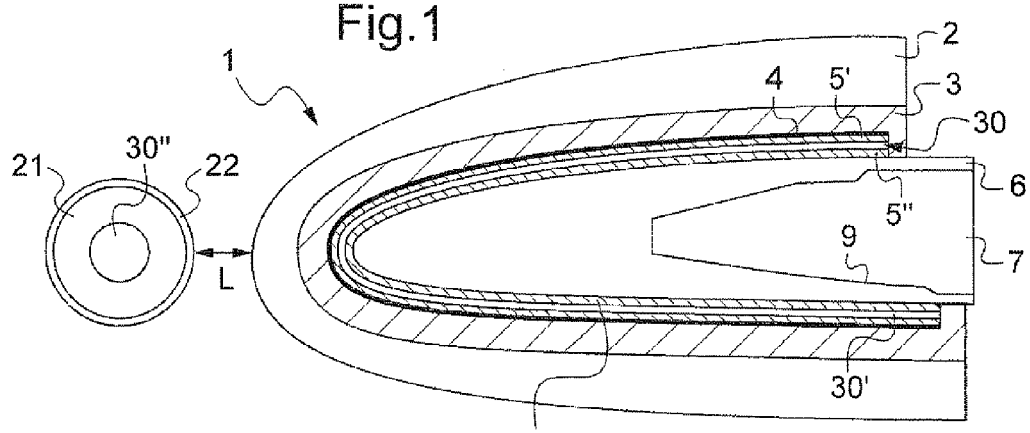
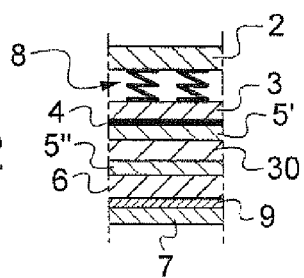
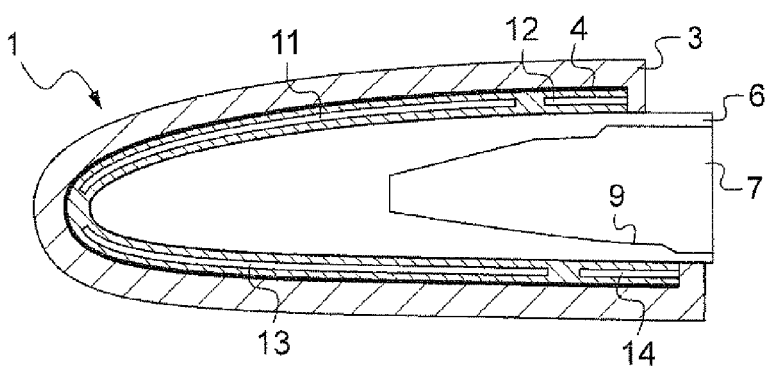
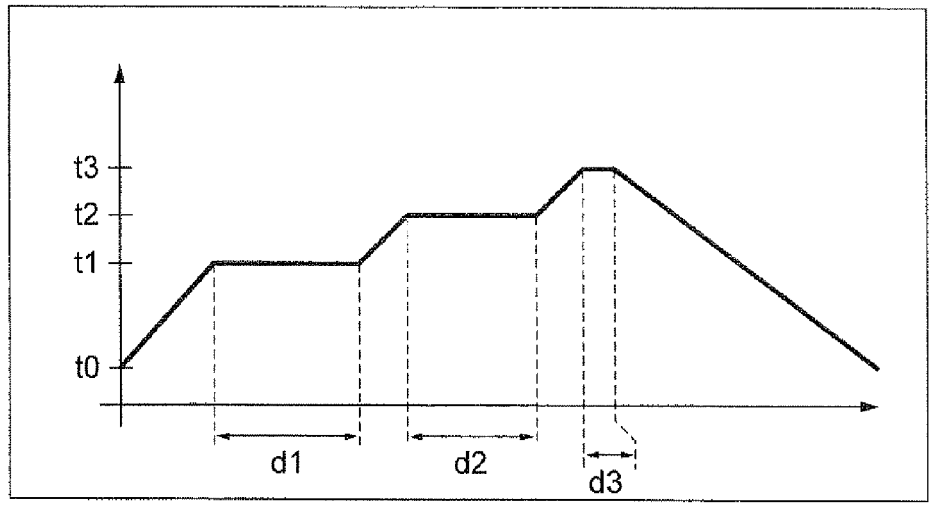

METHOD AND A DEVICE FOR BONDING A METAL FAIRING TO THE LEADING EDGE OF AN AIRFOIL

The present invention relates to a method and to a device for bonding a metal fairing to the leading edge of an aircraft airfoil, e.g. a rotorcraft rotor blade.

BACKGROUND OF THE INVENTION

The leading edge of a rotorcraft rotor blade is protected against impacts, e.g. by a U-section metal fairing bonded to the structure of the blade, or indeed by a fairing made from composite materials as taught in document EP 0 529 917 A, for example. The metal fairing thus protects the leading edge of the blade and also protects portions of the suction and pressure sides of the blade that are directly adjacent to the leading edge.

When the metal fairing is damaged by impacts, or even by an erosion phenomenon, it is appropriate to replace it with a new metal fairing so as to ensure that the blade will continue to be properly protected.

Furthermore, it can be necessary to remove the leading edge in order to repair the structure of the blade, particularly if the blade is made of composite material and surface layers of the structure are delaminating. Once the repair has been made, the leading edge needs to be put back into place.

A device is known that enables the metal fairing for the leading edge of a blade to be stuck back into position by using an adhesive that is placed between the metal fairing and the structure of the blade.

That device makes use of heater tooling that delivers the energy needed to polymerize an adhesive so as to secure the metal fairing to the structure of the blade, the adhesive being placed between the metal fairing and the structure of the blade. The heater tooling is constituted by a mat that is placed on the outside surface of the metal fairing.

The mat contains a heater resistance that is embedded in a layer of silicone. On being powered electrically, the heater resistance heats up, thereby enabling the metal fairing to be bonded to the structure of the blade. The heater resistance then heats the metal fairing by conduction, which fairing in turn transmits heat to the adhesive, thereby causing it to polymerize.

That device operates properly. Nevertheless, it presents a few drawbacks.

The first drawback is a consequence of using an electrical resistance. All of the elements surrounded by the heating mat are then heated by the mat, i.e. simultaneously the metal fairing, the adhesive, and the structure. That leads to energy consumption that is not necessarily optimized.

Similarly, a second drawback lies in an edge effect. A large amount of heat is lost by conduction from the edges of the device, which means that the device operates non-uniformly. Certain zones of the assembly comprising the metal fairing and the blade structure are thus heated to a smaller extent than others, thereby ending up with over-consumption of energy in order to compensate for the losses.

A third drawback is a consequence of the temperature rise times of the heater resistance, with rates of rise being very slow, of the order of 1.5 degrees Celsius per minute (° C./min). The duration of the cycle for heating the metal fairing can then easily amount to eight hours, which is penalizing industrially speaking from an economic point of view.

Furthermore, the airfoil is subjected to large temperature stresses over a long period due to the slow rises in temperature, and that can degrade the airfoil.

Finally, fabricating the mat is very lengthy, and therefore expensive and incompatible with urgent industrial demand, as can happen unfortunately when a manufacturer in possession of a heater mat that is in poor condition needs to repair a blade.

Document WO 01/30116 discloses a bonding device that includes induction heater means for melting an adhesive. Nevertheless, it would appear to be difficult to apply that bonding device to the metal fairing of the leading edge of an airfoil.

OBJECTS AND SUMMARY OF THE INVENTION

An object of the present invention is thus to provide a device for bonding a metal fairing uniformly and quickly to a leading edge, while avoiding the limitations of the above-mentioned devices.

According to the invention, a bonding device for bonding a protective metal fairing on the leading edge of an aircraft airfoil, which metal fairing is to be bonded against the airfoil with the help of an adhesive, is remarkable in that it comprises a rigid yoke in which induction heater means are inserted for heating the metal fairing for bonding to the airfoil.

Consequently, the induction heater means heats the metal fairing, which in turn heats the adhesive by conduction so as to cause it to polymerize. More precisely, the induction heater means create a varying magnetic field made up of a plurality of magnetic field lines that induce electromotive forces (emfs) within the metal material of the metal fairing. These electromotive forces then induce currents known as eddy currents that heat the material of the metal fairing by the Joule effect.

There are no losses due to edge effects, nor are there any due to elements being heated that are not involved with bonding the metal fairing on the leading edge, since only metal elements are heated by induction.

The induction heater means thus heat up the metal fairing very quickly, in particular because of the lack of heat losses. In addition, this method of heating is much faster than heating by conduction, e.g. in the manner implemented in the prior art.

Furthermore, the temperature of the adhesive is uniform insofar as it is possible for the magnetic field lines generated by the induction heater means also to be distributed uniformly without difficulty. The lack of losses due to edge effects guarantees that the temperature of the adhesive is more uniform, where such uniformity is of very great importance when bonding the leading edge fairing.

By way of example, it is then not necessary to heat the metal fairing for longer than the design time, since the temperatures to which it is heated are under full control.

Finally, since the heater device heats only the metal fairing, and the adhesive is heated by conduction from the fairing, the device does not run the risk of damaging the structure of the airfoil by heating it excessively.

Advantageously, the induction heater means are arranged between first and second primary layers of a thermo-expandable material, e.g. of the silicone type, the second primary layer matching the shape of the metal fairing while the device is in use.

The bonding device is then provided in succession with a rigid and non-deformable yoke, the first primary layer, the induction heater means, and then the second primary layer.

In addition, metal fairings for leading edges are conventionally of U-section. Thus, the first and second primary layers are also of U-section. The second primary layer then comes into contact with the outside surface of the metal fairing, while the inside surface of the metal fairing is in contact with the adhesive for bonding it to the airfoil.

Furthermore, the first and second primary layers are made of a thermo-expandable material. Thus, when the induction heater means heats up the metal fairing, the fairing delivers a certain amount of heat to the second primary layer by conduction.

Because of its consistency, the second primary layer then begins to expand. Since the yoke is rigid, it cannot deform under the effect of the second primary layer expanding. The second primary layer therefore exerts pressure on the metal fairing.

This phenomenon is of particular importance since it contributes to securing the metal fairing properly to the airfoil.

Under the action of the induction heater means, the adhesive polymerizes and therefore secures the metal fairing to the structure of the airfoil. In addition, the second primary layer expands and exerts pressure on the metal fairing so as to optimize bonding.

Similarly, the first primary layer also expands under the effect of the heating and contributes to the pressure being exerted by the device.

Furthermore, the second primary layer may be of thickness lying in the range 1 millimeter (mm) to 2 mm, and is preferably 1.5 mm thick. Surprisingly, induction heating is maximized by such a thickness.

In a variant, the device of the invention includes a secondary layer of thermo-expandable material disposed between said rigid yoke and said first primary layer. Thereafter, the bonding device is provided in succession with a non-deformable rigid yoke, with the secondary layer, with the first primary layer, with the induction heater means, and then with the second primary layer.

The second primary layer serves to insulate the yoke of the device so that the yoke is not heated by the induction heater means, the heater means devoting its energy essentially to heating the metal fairing.

Thus, the secondary layer advantageously presents a thickness lying in the range 6 mm to 8 mm.

Optionally, a metal plate is arranged between said secondary layer and said first primary layer.

The metal plate is heated by the induction heater means because of the distribution of the magnetic field lines generated by the heater means. It can thus heat the first primary layer and the secondary layer so that they expand and contribute to causing the bonding device to apply pressure to the metal fairing.

In order to maximize heating of the metal plate, the first primary layer has a thickness lying in the range 1 mm to 2 mm, and is preferably 1.5 mm thick.

The pressure generated by the bonding device contributes effectively to bonding the metal fairing to the airfoil. Nevertheless, surprisingly, this pressure can become harmful above a certain threshold.

If the pressure is too high, then the adhesive runs the risk of being expelled from the space between the metal fairing and the airfoil.

Consequently, the device of the invention optionally includes energy absorber means, e.g. rated springs, that are secured to said yoke.

Depending on the variant used, the absorber means should be arranged between the rigid yoke and the first primary layer, or else between the rigid yoke and the secondary layer.

In addition, it is advantageous to associate the bonding device with monitoring means for monitoring the pressure exerted by the device on the metal fairing in order to ensure that the pressure remains within acceptable limits.

The monitoring means are thus provided with an optical fiber embedded in the second primary layer, for example, and connected to a monitoring member.

Finally, it is possible to optimize the shape of the induction heater means to avoid creating hot zones that would lead to non-uniform heating of the metal fairing.

The induction heater means then comprises four groups of Litz wires, first and second groups being disposed between the first and second primary layers so as to be situated on the suction side of the fairing, and third and fourth groups being disposed between the first and second primary layers so as to be situated on the pressure side of the metal fairing.

Furthermore, the first group is separated from the second group so as to release a non-heated space, the third group also being separated from the fourth group.

Thus, the magnetic field lines generated by the heater means heat the metal fairing entirely uniformly.

The present invention also provides a bonding method enabling rapid and non-damaging bonding to be performed between a metal fairing and an airfoil.

According to the invention, a method of bonding a protective metal fairing on the leading edge of an aircraft airfoil, with adhesive being disposed between the metal fairing and the airfoil, and with the bonding device being arranged around an outside face of the metal fairing, is remarkable in that the following steps are performed in succession:

a) induction heating the metal fairing with the help of the bonding device to reach a first temperature at which the adhesive is liquefied so as to wet the airfoil and the metal fairing;

b) at the end of a first duration, increasing the temperature of the fairing to reach a second temperature enabling the adhesive to polymerize;

c) at the end of a second duration, increasing the temperature of the metal fairing to reach a third temperature in order to enable polymerization to be complete and uniform; and d) at the end of a third duration, causing the temperature of said metal fairing to decrease.

The method is particularly effective when it is implemented by the device of the invention when fitted with induction heater means enabling the fairing to be raised very quickly to temperature.

During step a), the adhesive thoroughly wets the metal fairing and the structure of the airfoil, thereby guaranteeing uniform bonding.

During step b), polymerization of the adhesive starts so that the bonding becomes effective.

Finally, during step c) the temperature is raised to a relatively high temperature, since the third temperature is higher than the theoretical polymerization temperature of the adhesive, but for a short duration only, thereby terminating polymerization of the adhesive.

To optimize the duration of the method, the first duration lies in the range 10 minutes (min) to 20 min and the third duration lies in the range 3 min to 10 min.

Similarly, the second duration, lying in the range 10 min to 20 min comes to an end when the polymerization of the adhesive reaches 60% to 80% of complete polymerization of the adhesive.

It should be observed that the third duration is very short so as to optimize the total duration of the method that is implemented. In order to achieve such a third duration, the third temperature is advantageously higher than the polymerization temperature of the adhesive. It then becomes possible to finish off polymerization of the adhesive and thus obtain total conversion of the adhesive from the liquid state to a solid state within a short length of time.

BRIEF DESCRIPTION OF THE DRAWINGS

The invention and its advantages appear in greater detail in the context of the following description of embodiments given by way of illustration and with reference to the accompanying figures, in which:

FIG. 1 is a section through a variant of the invention;

FIG. 2 is a diagrammatic view showing absorber means;

FIG. 3 is a section showing an optimized arrangement of the heater means; and

FIG. 4 is a graph explaining the steps of the invention.

Elements that are present in two or more figures are given the same reference in each of them.

MORE DETAILED DESCRIPTION

FIG. 1 is a section view showing a variant of the invention.

An adhesive 9 is placed at the end of an airfoil 7, a rotorcraft blade, for example, in order to secure a metal fairing 6 on the leading edge at this end of the airfoil.

Furthermore, a bonding device is arranged on the outside face F1 of the metal fairing to enable the adhesive to polymerize, where polymerization is a chemical process whereby an adhesive bonds to materials by being heated.

The bonding device 1 comprises a rigid yoke having arranged therein induction heater means 30 for heating the metal fairing 6.

More precisely, the induction heater means are inserted between first and second primary layers 5' and 5" of a thermo-expandable material such as silicone.

In addition, in a variant of the invention, the bonding device 1 is provided with a secondary layer 3 made of an insulating thermo-expandable material and of a metal plate 4, e.g. made of titanium.

The bonding device 1 then comprises in succession: a rigid yoke 2; a secondary layer; a metal plate 4; a first primary layer 5'; induction heater means 30; and a second primary layer 5" that fits closely to the outside surface F1 of the metal fairing 6.

Thus, when control means (not shown in the figures) are used to operate the induction heater means, the metal fairing is heated and in turn heats the adhesive to cause it to polymerize.

Furthermore, the induction heater means 30 also heat the metal plate 4.

Under such conditions, the second primary layer 5" in contact with the metal fairing 6 is subjected to an increase in temperature and begins to expand because of its material being thermo-expandable. The same applies to the secondary layer 3 and the first primary layer 5' that are in contact with the metal plate 4.

Since the yoke 2 is sufficiently rigid not to be deformable, the consequence of the thermo-expandable layers 5', 5", and 3 expanding is to create a pressure force from the bonding device 1 against the metal fairing 6, with this pressure force encouraging adhesion between the metal fairing 6 and the end of the airfoil 7.

In order to maximize the adhesion process, the first and second layers 5' and 5" are of thickness lying in the range 1 mm to 2 mm, preferably equal to 1.5 mm. Thus, the induction heater means 30 is at an optimum distance from the elements that it is to heat in uniform manner, i.e. the metal fairing 6 and the metal plate 4.

In contrast, the secondary layer 3 is of a thickness lying in the range 6 mm to 8 mm. This secondary layer thus insulates the yoke 2 so that it is not heated by the induction heater means.

Furthermore, the induction heater means are advantageously provided with a coil comprising a single wire, commonly referred to by the person skilled in the art as a "Litz wire". Such a Litz wire is made up of mutually insulated individual strands that are distributed sinusoidally within external protection, each strand periodically occupying all of the possible locations inside the external protection. Statistically, all of the strands are thus subjected to the same electromagnetic constraints. As a result, all of the strands convey similar currents, which implies that current density within the wire is uniform.

The induction heater means thus comprise a coil having a circuit 30', referred to for convenience as the "go" circuit, that is arranged between the first and second primary layers 5', 5" within the rigid yoke.

In addition, the coil of the induction heater means 30 has a circuit 30", referred for convenience as the "return" circuit. The return circuit 30" is arranged in a metal sheath 22 that is thermally insulated with the help of an insulating layer 21.

Advantageously, the metal sheath 22 surrounding the return circuit 30" of the induction heater means 30 is spaced apart from the rigid yoke 2 by a distance L of not less than 100 mm so that the return circuit does not have any influence on the magnetic field created by the go circuit 30'.

Finally, in order to control the heating cycle of the bonding device 1, the control means act firstly on the frequency, of the order of 50 kilohertz (kHz), that is applied to the heater means, and secondly on the current density that is delivered, where the current density is of the order of $4 \times 10^6$ to $6 \times 10^6$ amps per square meter ($A/m^2$).

In addition, it can be advantageous to monitor the pressure exerted by the bonding device 1 against the metal fairing 6 as a result of the expansion of the first and second primary layers 5' and 5" and of the secondary layer 3. Excessive pressure can have harmful consequences, since the adhesive can then be expelled from the airfoil by the adhesive creeping when subjected to high pressure.

Consequently, the bonding device is optionally provided with pressure monitoring means (not shown). Pressure monitoring can be obtained by means of an optical fiber connected to a monitoring member, the member being incorporated in the control means of the bonding device 1, for example.

The optical fiber is then disposed in one of the layers of the bonding device 1, preferably in the second primary layer 5".

A variation in the pressure exerted on the metal fairing gives rise to a variation in the pressure exerted on the optical fiber, and thus to the intensity of the light it conveys. As a function of this light intensity, the control member deduces the pressure being exerted and communicates this information to the control means that, for example, can then switch off the induction heater means in the event of the pressure being excessive.

Similarly, with reference to FIG. 2, it is possible to provide energy absorber means that are secured to the rigid yoke 2 for absorbing energy in the event of the thermo-expandable materials expanding excessively.

The energy absorber means then comprise rated springs 8 that are secured to the rigid yoke 2 and also to the second secondary layer 3. If the pressure exerted by the bonding device on the metal fairing 6 tends to exceed a predetermined threshold, then the rated springs 8 retract, thereby enabling the pressure exerted on the metal fairing to be maintained at no more than the level of said threshold.

It should be observed that if the variant of the invention that is being implemented does not include a secondary layer 3 or a metal plate 4, then the rated springs should be secured to the second primary layer 5'.

FIG. 3 is a section showing an optimized arrangement for the heater means.

The go circuit 30' of the induction heater means 30 arranged between the first and second primary layers then have four separate groups of Litz wires, with an insulating material such as silicone being disposed between adjacent pairs of groups.

Subsequently, first and second groups 11, 12 are disposed on the suction side of the metal fairing 6. Similarly, third and fourth groups 13, 14 are arranged on the pressure side of the metal fairing.

This particular arrangement of the induction heater means serves to avoid forming hot points that would result in non-uniform heating being implemented by the bonding device 1.

In addition, in order to be able to adapt the device to any airfoil, it is possible to envisage making it as two distinct blocks that are connected together by springs at the leading edge of the metal fairing.

The first block would then comprise the first and second groups 11 and 12 and the second block would then possess the third and fourth groups 13 and 14.

FIG. 4 shows the method implemented by the bonding device of the invention.

In a preliminary step, an operator begins by placing an adhesive on the end of the airfoil 7 that is to receive the metal fairing on its leading edge.

Thereafter, the operator puts the metal fairing in place and then arranges the bonding device 1 on the metal fairing.

Bonding proper can then begin.

During a step a), the control means activate the induction heater means so that the metal fairing reaches a first temperature t1. Temperature then rises quickly, at a rate lying in the range 2° C./min to 10° C./min.

If it is assumed that the adhesive is an adhesive of the 120° C. class, i.e. an adhesive that polymerizes at 120° C., then 6 min are required to reach a first temperature t1 of about 80° C. starting from an ambient temperature t0 of 20° C.

At this temperature t1, the adhesive is sufficiently fluid to completely wet the surfaces with which it is in contact, i.e. the surface of the end of the airfoil and the surface of the metal fairing, as is essential for obtaining uniform bonding. Said surfaces are fully wetted when the interface zone between the surfaces for bonding together is free from any bubbles of air, such that the interface zone includes only the adhesive distributed in uniform manner so as to impregnate the fabrics for bonding together.

At the end of a first duration d1 lying in the range 10 min to 20 min, step b) begins.

The control means then raises the temperature of the metal fairing 6 at a rate lying in the range 5° C./min to 10° C./min so as to reach a second temperature t2 that enables polymerization to begin.

Since the adhesive is of the 120° C. class, the second temperature at which polymerization starts is about 110° C., with this second temperature depending on the chemical constituting the adhesive being used.

At the end of a second duration d2, lying in the range 10 min to 20 min, polymerization of the adhesive reaches 60% to 80% of complete polymerization.

To reduce the heating time, at the end of this second duration d2, the control means engages a step c) for terminating polymerization. It then increases the temperature of the metal fairing at a rate lying in the range 5° C./min to 15°/min, but possibly as great as 30° C./min should that be necessary, in order to reach a third temperature t3 of about 140° C. when the adhesive is of the 120° C. class.

The control means then maintains this third temperature for a third duration d3 that is very short, lying in the range 3 min to 10 min, prior to causing the temperature to decrease progressively, at a rate of the order of 2° C./min during a step d).

The bonding method is consequently very fast. In addition, because of the specific nature of the heater means, heating is performed uniformly over the entire area of the metal fairing.

Furthermore, high temperatures t3 are maintained for a duration d3 that is short and therefore does not risk damaging the airfoil.

Naturally, the present invention is capable of being subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

In particular, the values of the first, second, and third temperatures, and also the values of the above-mentioned first, second, and third durations depend on the adhesive that is used, and they apply more specifically to an adhesive of the 120° C. class.

Depending on the characteristics of the adhesive that is used for bonding the leading-edge fairing, these various values could naturally be different from those mentioned, without thereby going beyond the ambit of the invention, the method itself remaining identical.

What is claimed is:

1. A bonding device for bonding a metal fairing for protecting a leading edge of an aircraft airfoil, said metal fairing having a shape and being for bonding against said airfoil with the help of an adhesive, said device comprising a rigid yoke in which induction heater means are inserted for heating said metal fairing, and wherein said induction heater means are arranged between first and second primary layers of a thermo-expandable material, said second primary layer matching to the shape of said metal fairing while said device is in use, wherein said induction heater means comprises four groups of Litz wires, first and second groups being disposed between said first and second primary layers so as to be situated on a suction side of said fairing, and third and fourth groups being disposed between said first and second primary layers so as to be situated on a pressure side of said metal fairing, and wherein said first group is separated from said second group so as to release a non-heated space, said third group also being separated from said fourth group.

2. The device according to claim 1, wherein said first primary layer has a thickness lying in the range 1 mm to 2 mm and said second primary layer has a thickness lying in the range 1 mm to 2 mm.

3. The device according to claim 1, including a secondary layer of thermo-expandable material disposed between said rigid yoke and said first primary layer.

4. The device according to claim 3, wherein said secondary layer has a thickness lying in the range 6 mm to 8 mm.

5. The device according to claim 3, wherein a metal plate is arranged between said secondary layer and said first primary layer.

6. The device according to claim 1, including energy absorber means secured to said yoke.

7. The device according to claim 1, the device being provided with monitoring means for monitoring the pressure exerted by said device on said fairing.

8. The device according to claim 7, wherein said monitoring means are provided with an optical fiber connected to a monitor member, wherein said optical fiber is embedded in said second primary layer.

9. The device according to claim 1, wherein said second primary layer has a curved shape.

10. The device according to claim 1, wherein said induction heater means has a curved shape and said first and second primary layers have a curved shape.

11. The device according to claim 1, wherein said thermo-expandable material comprises silicone.

12. The device according to claim 1, wherein said first and second primary layers of thermo-expandable material are capable of expanding to exert pressure on said metal fairing exposed to heat from said induction heater means.

13. A bonding device for bonding a metal fairing to an aircraft airfoil for protecting a leading edge of the aircraft airfoil, said metal fairing having a curved shape and being for bonding against said airfoil with the help of an adhesive, said device comprising a rigid yoke housing an induction heater for heating said metal fairing, said induction heater being arranged between first and second primary layers of a thermo-expandable material, said second primary layer being of a shape to correspond to the curved shape of said metal fairing and being housed within and adjacent the rigid yoke, wherein said induction heater comprises four groups of Litz wires, first and second groups being disposed between said first and second primary layers so as to be situated on a suction side of said fairing, and third and fourth groups being disposed between said first and second primary layers so as to be situated on a pressure side of said metal fairing, and wherein said first group is separated from said second group so as to release a non-heated space, said third group also being separated from said fourth group.

14. The device according to claim 13, wherein said induction heater has a curved shape and said first and second primary layers have a curved shape, and wherein said thermo-expandable material comprises silicone.

15. A bonding device for adhesively bonding a metal fairing having a shape to an aircraft airfoil, said device comprising:
a non-deformable rigid yoke having a first curved surface;
a first primary layer of thermo-expandable material secured adjacent to said yoke, said first primary layer having a second curved surface disposed within and facing said first curved surface;
an induction heater for heating said metal fairing, said heater secured within to said first primary layer of thermo-expandable material; and
a second primary layer of a thermo-expandable material secured adjacent to said induction heater, wherein said second primary layer corresponds to the shape of said metal fairing while said device is in use, said induction heater is disposed between said first and second primary layers, wherein said induction heater comprises four groups of Litz wires, first and second groups being disposed between said first and second primary layers so as to be situated on a suction side of said fairing, and third and fourth groups being disposed between said first and second primary layers so as to be situated on a pressure side of said metal fairing, and wherein said first group is separated from said second group so as to release a non-heated space, said third group also being separated from said fourth group.

16. The device according to claim 15, wherein said induction heater has a curved shape.

17. The device according to claim 15, wherein said thermo-expandable material comprises silicone and wherein said first and second primary layers of thermo-expandable material are capable of expanding to exert pressure on said metal fairing exposed to heat from said induction heater means.

* * * * *